(12) United States Patent
Azusawa (10) Patent No.: US 9,705,373 B2
(45) Date of Patent: Jul. 11, 2017

(54) INSULATOR

(71) Applicant: HONDA MOTOR CO., LTD., Tokyo (JP)

(72) Inventor: Keisuke Azusawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/131,927

(22) Filed: Apr. 18, 2016

(65) Prior Publication Data

US 2016/0308416 A1    Oct. 20, 2016

(30) Foreign Application Priority Data

Apr. 20, 2015  (JP) .................................. 2015-086118

(51) Int. Cl.
*H02K 3/32* (2006.01)
*H02K 3/34* (2006.01)

(52) U.S. Cl.
CPC .................................. *H02K 3/345* (2013.01)

(58) Field of Classification Search
None
See application file for complete search history.

(56) References Cited

U.S. PATENT DOCUMENTS

| | | | |
|---|---|---|---|
| 2009/0102311 A1* | 4/2009 | Kotani | H02K 3/345 310/215 |
| 2012/0286619 A1* | 11/2012 | Tsuiki | H02K 3/522 310/215 |

FOREIGN PATENT DOCUMENTS

| | | |
|---|---|---|
| WO | 2011/136144 A1 | 11/2011 |
| WO | 2013/133337 A1 | 9/2013 |

* cited by examiner

*Primary Examiner* — Dimary Lopez Cruz
(74) *Attorney, Agent, or Firm* — Chip Law Group (57) ABSTRACT

An insulator includes a first insulator segment and a second insulator segment that are substantially L-shaped. The first insulator segment includes a side portion, on which an insulating sheet is disposed so as to cover at least a part of one circumferential-direction end surface of the tooth, and a front portion facing one stacking-direction end surface of the tooth. The second insulator segment includes a side portion, on which an insulating sheet is disposed so as to cover at least a part of the other circumferential-direction end surface, and a front portion facing the other stacking-direction end surface. A rectangular protrusion formed on the first insulator segment and a rectangular hole formed in the second insulator segment engage with each other so as to have a movement clearance in which the rectangular protrusion and the rectangular hole are relatively movable in a stacking direction.

8 Claims, 7 Drawing Sheets

INSULATOR

CROSS REFERENCES TO RELATED APPLICATIONS

The present application claims priority under 35 U.S.C. §119 to Japanese Patent Application No. 2015-086118, filed Apr. 20, 2015, entitled "Insulator." The contents of this application are incorporated herein by reference in their entirety.

BACKGROUND

1. Field

The present disclosure relates to an insulator that electrically insulates a stator core, including a plurality of electrical steel plates that are stacked, from a coil wire.

2. Description of the Related Art

In a stator of existing rotating electric machines, a resin insulator is disposed between a tooth of a stator core, including a plurality of electrical steel plates that are stacked in the axial direction, and a coil wire, which is wound around the tooth, to electrically insulate the stator core from the coil wire.

For the stator, the space factor of the coil wire is important in increasing the magnetomotive force of a rotating electric machine. Reducing the thickness of the insulator is effective in increasing the space factor. However, reduction in the thickness of the entirety of an insulator is limited, because the insulator is usually made by molding a resin. For this reason, some insulators disclosed to date include a portion that is made from an insulating sheet, such as an insulating film or an insulating paper (see, for example, International Publication No. 2013/133337 and Japanese Unexamined Patent Application Publication No. 2011-234537).

The insulators described in International Publication No. 2013/133337 and Japanese Unexamined Patent Application Publication No. 2011-234537 include a tubular body, which is made from an insulating film, and resin flanges, which are integrally molded with the body by insert molding. In these insulators, by making the body from a thin insulating film so as to surround a tooth, the space factor of a coil wire wound around the tooth is increased.

A stator core that is made by stacking a plurality of electrical steels or the like in the axial direction inevitably has a variation in the dimension in the stacking direction. The insulator described in International Publication No. 2013/133337, which includes a pair of segments that are substantially U-shaped and assembled in the circumferential direction, is not capable of accommodating the variation in the thickness of the stator core in the stacking direction. Therefore, considering the variation in the thickness of an iron core portion in the stacking direction, it is necessary to form the insulator so as to have an allowance of the length in the stacking direction so that the insulator can be attached to the core portion even if the stacking thickness becomes the maximum due to the variation. In this case, however, when winding a coil wire around the insulator, parts of the insulator between turns of the coil wire may become deformed do to the tension of the coil wire and the insulating film may be damaged. This damage might negatively affect the performance of the rotating electric machine.

Japanese Unexamined Patent Application Publication No. 2011-234537 describes an insulator according to an embodiment in which a body, which is made of an insulating film, and a resin flange are integrated with each other by performing insert molding by disposing the insulating film in an insert molding die. Also in this case, as with International Publication No. 2013/133337, it is not possible to accommodate the variation in the dimension in the stacking direction.

Japanese Unexamined Patent Application Publication No. 2011-234537 also describes an insulator according to another embodiment including a pair of segments that are substantially U-shaped and assembled in the stacking direction. Although this insulator is capable of accommodating the variation in the dimension in the stacking direction, fitting portions of the segments are located above and below a coil-wire-disposing region formed between circumferential-direction end surfaces, which are adjacent to each other. Moreover, because the segments need to overlap each other in the fitting portions, thickness is increased at the overlapping portion, and the space factor of a coil wire might decrease.

SUMMARY

The present application describes an insulator that can increase the space factor of a coil wire, that can accommodate a variation in the dimension in the stacking direction, and that can be easily attached to a stator core.

According to an aspect of the present disclosure, an insulator (for example, an insulator 10 in the embodiment described below), which is disposed between a tooth (for example, a tooth 54 in the embodiment described below) of a stator core (for example, a core portion 51 in the embodiment described below) and a coil wire (for example, a coil wire 2 in the embodiment described below) wound around the tooth, the stator core including a plurality of magnetic plates (for example, electrical steel plates 52 in the embodiment described below) that are stacked, the tooth extending in a radial direction, includes a pair of segments (for example, a first insulator segment 10A and a second insulator segment 10B in the embodiment described below) that are assembled, each of the segments including a resin-molded portion (for example, resin-molded portions 13 and 23 in the embodiment described below) and an insulating sheet (for example, insulating sheets 14 and 24 in the embodiment described below) connected to the resin-molded portion. Each of the segments is substantially L-shaped and includes a side portion (for example, side portions 11 and 21 in the embodiment described below), on which the insulating sheet is disposed so as to cover at least a part of a circumferential-direction end surface (for example, circumferential-direction end surfaces 54R and 54L in the embodiment described below) of the tooth, and a front portion (for example, front portions 12 and 22 in the embodiment described below), which faces a stacking-direction end surface (for example, stacking-direction end surfaces 54F and 54B in the embodiment described below) of the tooth. A first engagement portion (for example, a rectangular protrusion 18 in the embodiment described below) formed in one of the segments and a second engagement portion (for example, a rectangular hole 28 in the embodiment described below) formed in the other segment engage with each other so as to have a movement clearance in which the first engagement portion and the second engagement portion are relatively movable in a stacking direction.

With the structure described above, the insulator includes the segments that are assembled, and the first engagement portion and the second engagement portion engage with each other so as to have a movement clearance in which the first engagement portion and the second engagement portion are relatively movable in the stacking direction. Accordingly, even if the thickness of the stator core in the stacking direction varies, the engagement portions can accommodate the variation in the stacking direction. Therefore, damage to the insulating sheet, such as creasing or breakage, can be prevented and the insulator can be easily attached to the stator core. Moreover, because the insulating sheet covers the circumferential-direction end surface of the tooth, the thickness of a part of the insulator that faces the circumferential-direction end surface can be reduced. Therefore, the space factor of the coil wire can be increased. Furthermore, because the insulator is made by assembling the segments, which are substantially L-shaped, the engagement portions can be formed at positions outside a coil wire-disposing region between the circumferential-direction end surfaces, which are adjacent to each other. As a result, decrease of the space factor of the coil wire can be suppressed, even if the thickness is increased in the overlapping portion.

In the insulator, at least one of the first engagement portion and the second engagement portion may be formed in the resin-molded portion.

In this case, the first engagement portion and the second engagement portion can be easily made by resin molding. Therefore, the pair of segments can be efficiently manufactured.

In the insulator, a flange (for example, inner flanges 15 and 25 and outer flanges 16 and 26 in the embodiment described below) may stand out from at least one of the side portion and the front portion, and at least one of the first engagement portion and the second engagement portion may be formed in the flange.

In this case, the flange stands out from the side portion or the front portion, around which a coil wire is wound. Therefore, the first engagement portion and the second engagement portion can be disposed at positions that do not substantially affect winding of the coil wire. As a result, decrease of the space factor of the coil wire due to the presence of the first engagement portion and the second engagement portion can be suppressed.

In the insulator, the flange may include an inner flange (for example, inner flanges 15 and 25 in the embodiment described below) and an outer flange (for example and outer flanges 16 and 26 in the embodiment described below), the first engagement portion may be formed in each of the inner flange and the outer flange of the one of the segments, and the second engagement portion may be formed in each of the inner flange and the outer flange of the other segment.

In this case, the pair of segments can be more reliably fixed to each other.

In the insulator, a flange (for example, an inner side flange 15a and an outer side flange 16a in the embodiment described below) including a stacking-direction extension (for example, stacking-direction extensions 15c and 16c in the embodiment described below) may stand out from the side portion of the one of the segments, which the stacking-direction extension extending further than the front portion in the stacking direction; a flange (for example, an inner front flange 25b and an outer front flange 26b in the embodiment described below) including a circumferential-direction extension (for example, circumferential-direction extensions 25d and 26d in the embodiment described below) may stand out from the front portion of the other segment, the circumferential-direction extension extending further than the side portion in the circumferential direction; the stacking-direction extension and the circumferential-direction extension may be assembled so as to have an overlapping portion at which the stacking-direction extension and the circumferential-direction extension overlap each other; and the first engagement portion and the second engagement portion may be formed in the overlapping portion.

In this case, when attaching the pair of segments to the stator core, the first engagement portion and the second engagement portion can be easily made to engage with each other.

In the insulator, the first engagement portion may be a protrusion (for example, a rectangular protrusion 18 in the embodiment described below), the second engagement portion may a groove or a hole (for example, a rectangular hole 28 in the embodiment described below), and a length of the second engagement portion in the stacking direction (for example, the length A of the rectangular hole in the stacking direction in the embodiment described below) may be greater than a length of the first engagement portion in the stacking direction (for example, the length B of the rectangular protrusion in the stacking direction in the embodiment described below).

In this case, the length of the second engagement portion in the stacking direction is greater than the length of the first engagement portion in the stacking direction. Therefore, even if there is a variation in the stacking thickness of the plurality of plates of the stator core, the variation of the stacking thickness can be accommodated due to the difference between the length of the first engagement portion and the length of the second engagement portion. Moreover, the pair of segments can be easily attached to the stator core, and damage to the insulating sheets of the pair of segments can be suppressed.

In the insulator, a difference between the length of the second engagement portion in the stacking direction and the length of the first engagement portion in the stacking direction may be greater than a variation in a stacking thickness of the plurality of plates that are stacked (for example, the variation $\Delta$ in the stacking thickness of in the embodiment described below).

In this case, the difference between the length of the second engagement portion in the stacking direction and the length of the first engagement portion in the stacking direction is greater than the variation in the stacking thickness of the plurality of plates that are stacked. Therefore, even if there is a variation in the stacking thickness of the plurality of plates of the stator core, the variation in the stacking thickness can be reliably accommodated due to the difference between the length of the first engagement portion and the length of the second engagement portion. Moreover, the pair of segments can be easily attached to the stator core, and damage to the insulating sheet of the pair of segments can be suppressed.

In the insulator, wherein a protrusion (for example, protrusions 19 and 29 in the embodiment described below) and a groove (for example, grooves 17 and 27 in the embodiment described below), which are fitted to each other when the segments are assembled, may be disposed in a corner formed by the side portion of the one of the segments and the front portion of the other segment and a corner formed by the front portion of the one of the segments and the side portion of the other segment.

In this case, the protrusion and the groove are formed in each of the corners at which the one of the segments and the other segments are joined to each other and the protrusion and the groove engage with each other when the segments are assembled. Therefore, a predetermined creepage distance can be provided at the corners, and the stator core and the coil wire can be reliably insulated from each other.

DESCRIPTION OF THE PREFERRED EMBODIMENTS

Figure 1:
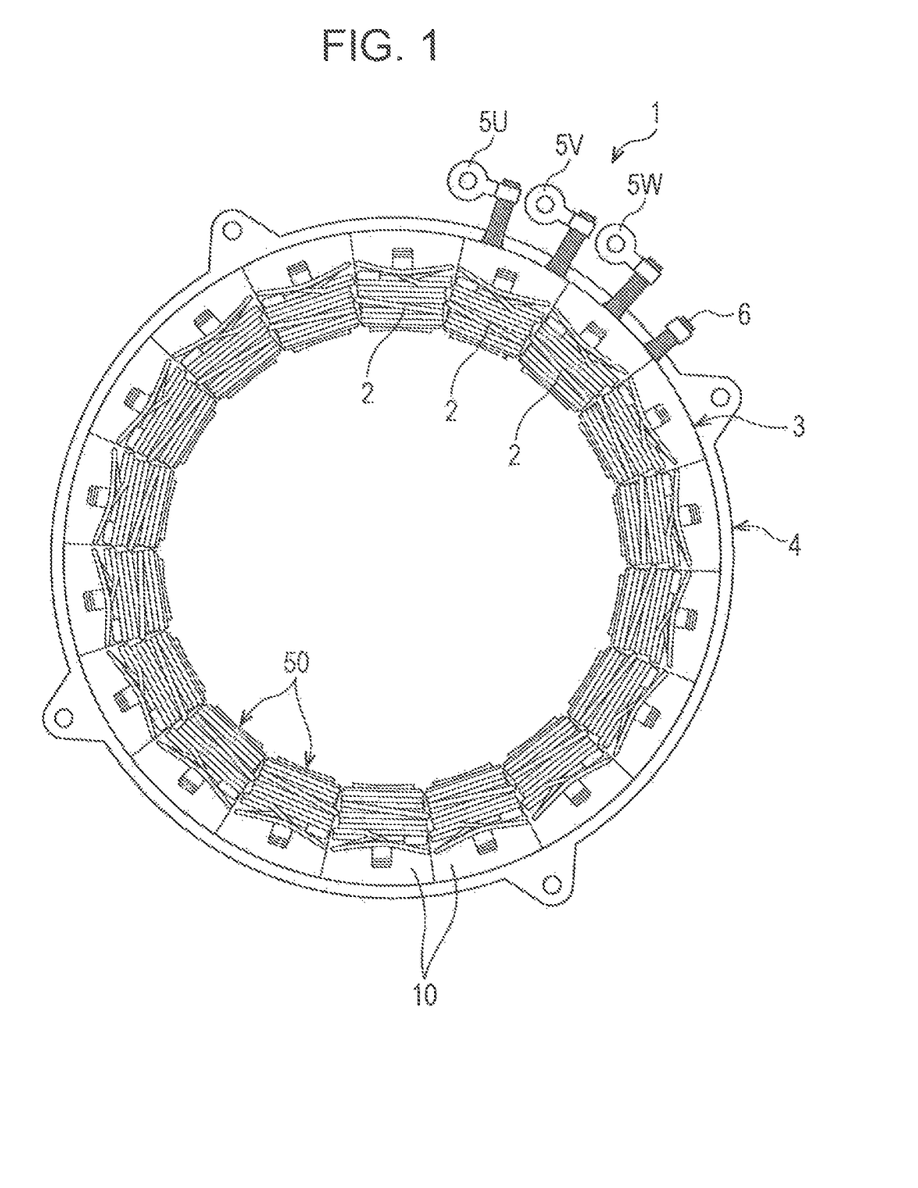
FIG. 1 is a front view of a stator of a rotating electric machine according to an embodiment of the present disclosure.

Hereinafter, an insulator according to an embodiment of the present disclosure and a stator of a rotating electric machine including the insulator will be described with reference to the drawings. The orientations of the drawings are the same as those of the numerals shown in the drawings.
Stator FIG. 1 is a front view of a stator of a rotating electric machine according to an embodiment of the present disclosure. The rotating electric machine according to the embodiment is a three-phase alternating current rotating electric machine that is used to drive a vehicle, such as an electric automobile and a hybrid vehicle, and to perform regenerative braking of the vehicle. A rotor (not show) is rotatably disposed inside an annular stator 1. The rotor is connected to the axle of the vehicle through a transmission mechanism and the like so that driving power can be transferred to the axle.

The stator 1 includes an annular stator body 3 and a substantially cylindrical holder 4. A plurality of coil wires 2 are mounted on the stator body 3 by salient-pole intensive winding. The stator body 3 is press-fitted into the holder 4. The coil wires 2 for U-phase, V-phase, and W-phase have input ends, which extend outward from the stator body 3 in the radial direction of the holder 4. To the input ends of the coil wires 2, power input terminals 5U, 5V, and 5W for the corresponding phases are connected. In the present embodiment, each coil wire 2 is a flat rectangular wire having a rectangular cross section.

The stator body 3 includes stator units 50 that are arranged in an annular shape. In each of the stator units 50 of the annular stator core, the coil wire 2 is wound around an insulator 10, which is substantially fan-shaped in front view. First ends of the coil wires 2, which are wound around the insulators 10, for each of the phases are connected to each other and connected a corresponding one of the power input terminals 5U, 5V, and 5W for the phase, and second ends of the coil wires 2 are connected to each other at a central connection point 6. Accordingly, in the stator 1 according to the present embodiment, the coil wires 2 for the three phases are connected to each other so as to form a star connection.
Stator Unit Referring to FIG. 2, the stator unit 50 includes a core portion 51, the insulator 10, and a coil wire 2. The core portion 51 includes a plurality of electrical steel plates 52 that are stacked in the axial direction. Each of the electrical steel plates 52 is substantially T-shaped and made by punch pressing. The insulator 10 electrically insulates the core portion 51. The coil wire 2 is wound around the core portion 51 with the insulator 10 therebetween.

Figure 2:
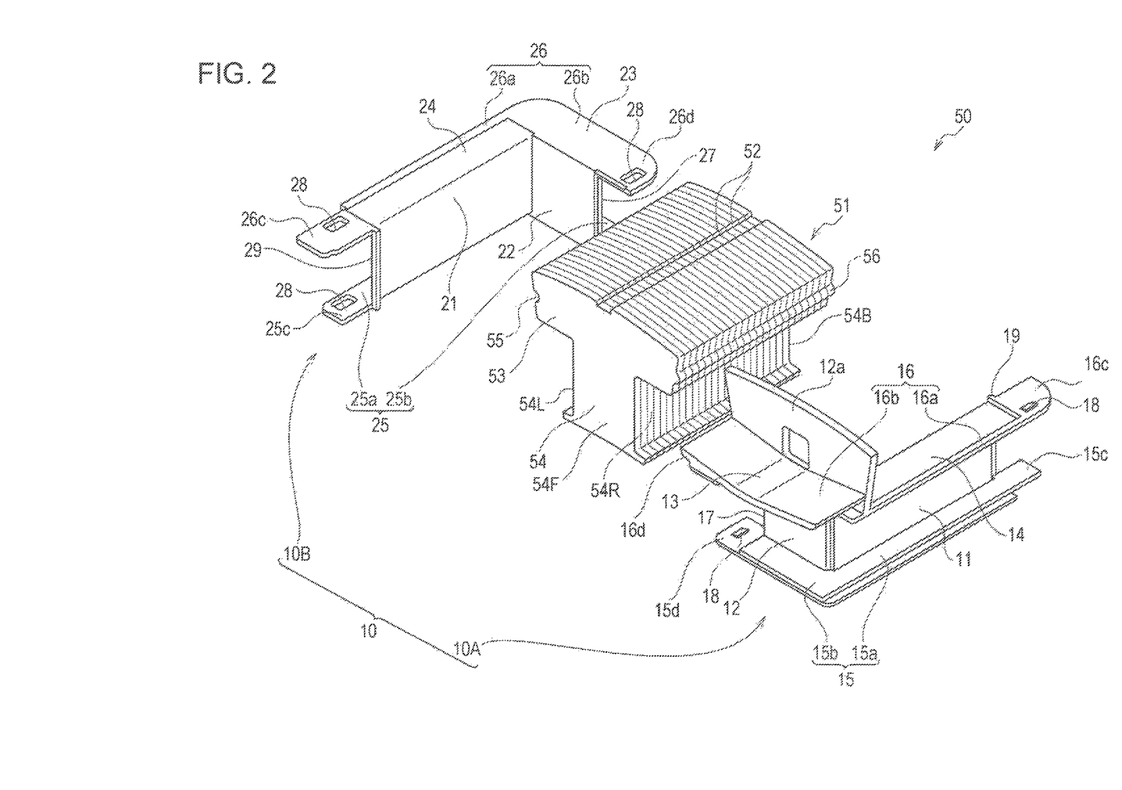
FIG. 2 is an exploded perspective view of a stator unit of the stator of FIG. 1.

The core portion 51, which is substantially T-shaped, includes a yoke 53 and a tooth 54. The yoke 53 is an outer part of the core portion 51 extending in the circumferential direction. The tooth 54 is a part of the core portion 51 extending inward from the yoke 53. At one end of the yoke 53 in the circumferential direction, an engagement recess 55, having a substantially semicircular cross section, is formed. At the other end of the yoke 53 in the circumferential direction, an engagement protrusion 56, having a substantially semicircular cross section, is formed so as to correspond to the engagement recess 55. When annularly arranging a plurality of core portions 51 to form the stator core, the engagement recesses 55 and the engagement protrusions 56 of the yokes 53 engage with each other to accurately position the core portions 51.
Insulator The insulator 10 includes a first insulator segment 10A and a second insulator segment 10B, each of which is substantially L-shaped. The first insulator segment 10A and the second insulator segment 10B are assembled in a substantially rectangular frame-like shape in plan view.
First Insulator Segment The first insulator segment 10A includes a side portion 11, which covers a circumferential-direction end surface 54R of the tooth 54 of the core portion 51, and a front portion 12, which covers a stacking-direction end surface 54F of the core portion 51. The front portion 12 includes a part of a resin-molded portion 13. The side portion 11 includes a part of the resin-molded portion 13 including an inner flange 15 and an outer flange 16 (described below) and an insulating sheet 14 connected to the resin-molded portion 13. The resin-molded portion 13 included in the side portion 11 and the front portion 12 is integrally formed with the insulating sheet 14 by insert molding.

The first insulator segment 10A includes the inner flange 15, which stands out from inner parts of the side portion 11 and the front portion 12. The inner flange 15 includes an inner side flange 15a, which stands out from an inner part of the side portion 11 in the circumferential direction, and an inner front flange 15b, which stands out from an inner part of the front portion 12 in the stacking direction. The inner side flange 15a and the inner front flange 15b are integrally formed so as to surround the peripheries of the side portion 11 and the front portion 12.

The first insulator segment 10A includes the outer flange 16, which stands out from outer parts of the side portion 11 and the front portion 12. The outer flange 16 includes an outer side flange 16a, which stands out from an outer part of the side portion 11 in the circumferential direction, and an outer front flange 16b, which stands out from an outer part of the front portion 12 in the stacking direction. The outer side flange 16a and the outer front flange 16b are integrally formed so as to surround the peripheries of the side portion 11 and the front portion 12. Moreover, the front portion 12 includes a supporting wall 12a extending outward in the radial direction. The supporting wall 12a and the outer front flange 16b of the first insulator segment 10A also serve as a guide portion that guides the coil wire 2 extending outward from the stator unit 50 to one of the power input terminals 5U, 5V, and 5W and the central connection point 6.

Figure 4A:
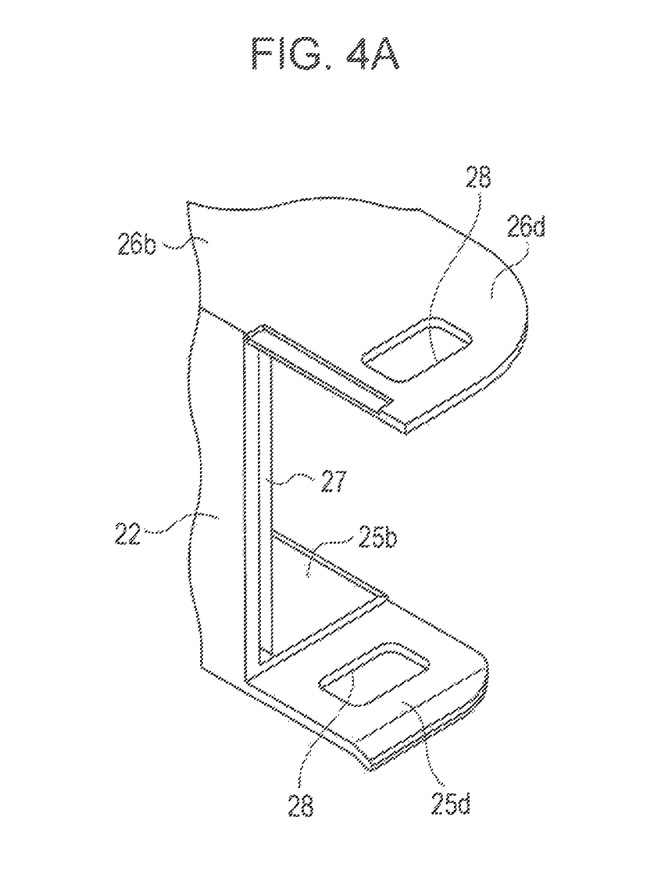
FIG. 4A is a perspective view of a groove formed in a second insulator segment.
Figure 4B:
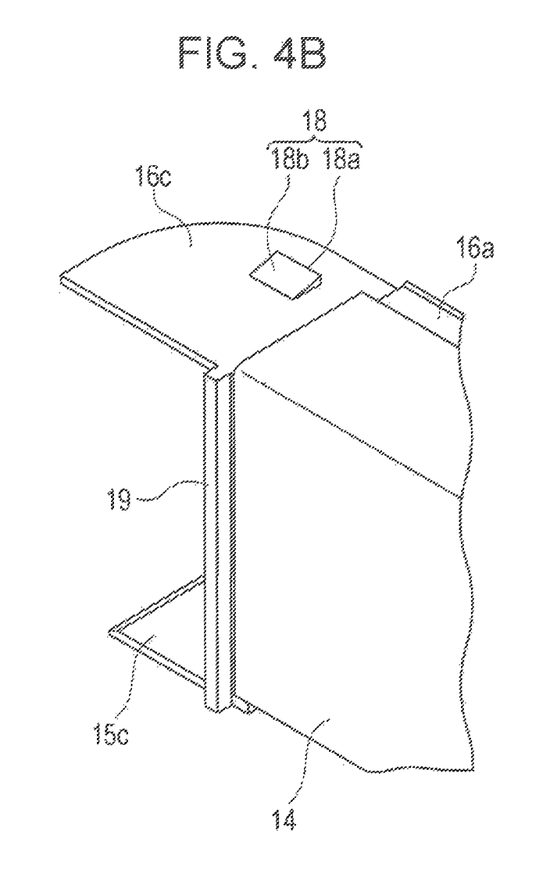
FIG. 4B is a perspective view of a protrusion formed on a first insulator segment.

Referring also to FIG. 4B, stacking-direction extensions 15c and 16c are respectively formed on the inner side flange 15a and the outer side flange 16a so as to extend away from the front portion 12 in the stacking direction. The thickness of the stacking-direction extension 15c is substantially a half the thickness of the inner side flange 15a, because an inner part of the thickness thereof is removed. The thickness of the stacking-direction extension 16c is substantially a half the thickness of the outer side flange 16a, because an outer part of the thickness thereof is removed.

Rectangular protrusions 18, each of which is an example of a first engagement portion, respectively protrude downward from the lower surface of the stacking-direction extension 15c and upward from the upper surface of the stacking-direction extension 16c (note that one of the rectangular protrusions 18 on the stacking-direction extension 15c is not illustrated). Each of the rectangular protrusion 18 has a rectangular shape in plan view and includes a vertical wall 18a and an inclined surface 18b, which form a substantially right-triangular shape. The vertical wall 18a stands out upward (or downward) substantially perpendicularly from one side of a corresponding one of the stacking-direction extensions 15c and 16c in the circumferential direction. The inclined surface 18b extends so as to be inclined from the top of the vertical wall 18a toward the other side in the circumferential direction.

Circumferential-direction extensions 15d and 16d are respectively formed on the inner front flange 15b and the outer front flange 16b so as to extend away from the side portion 11 in the circumferential direction. The thickness of the circumferential-direction extension 15d is substantially a half the thickness of the inner front flange 15b, because an outer part of the thickness thereof is removed. The thickness of the circumferential-direction extension 16d is substantially a half the thickness of the outer front flange 16b, because an inner part of the thickness thereof is removed.

Rectangular protrusions 18, each of which is an example of a first engagement portion, respectively protrude upward from the upper surface of the circumferential-direction extension 15d and downward from the lower surface of the circumferential-direction extension 16d (note that one of the rectangular protrusions 18 on the circumferential-direction extension 16d is not illustrated). The rectangular protrusions 18 each have a substantially right-triangular shape having the vertical wall 18a on one side in the circumferential direction, as with the rectangular protrusions 18 on the stacking-direction extensions 15c and 16c.

Figure 7:
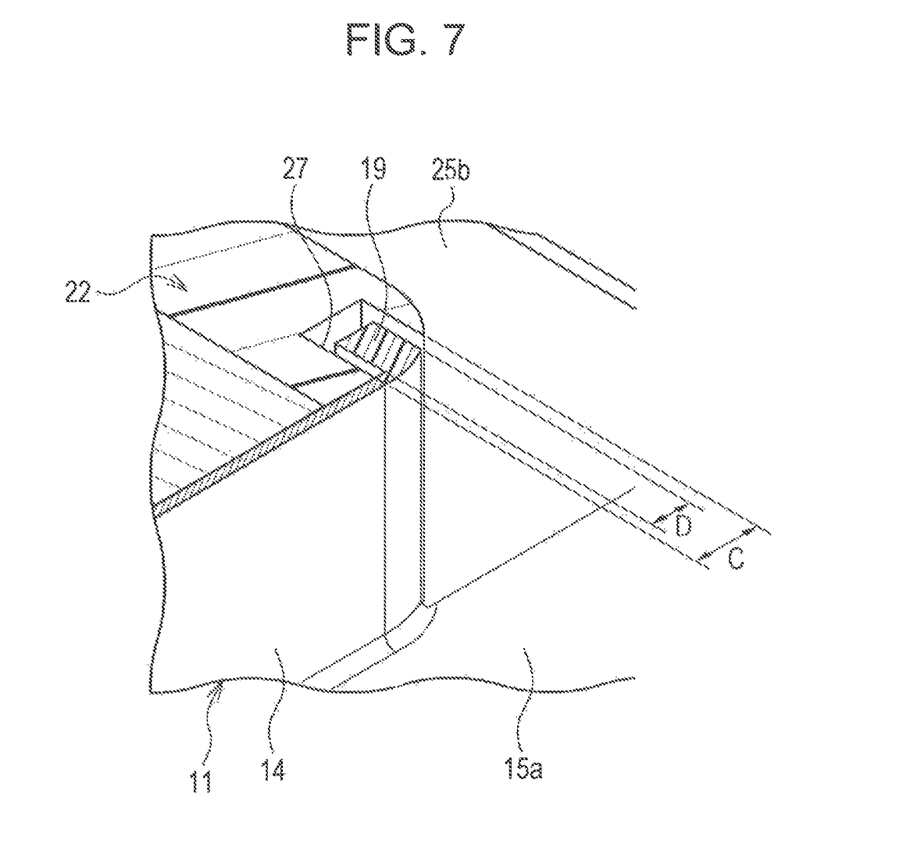
FIG. 7 is a partial enlarged sectional view illustrating how the groove formed in the second insulator segment and the protrusion formed on the first insulator segment engage with each other.

Referring also to FIG. 7, a protrusion 19 is formed on the side portion 11 so as to protrude toward the second insulator segment 10B. The protrusion 19 is located at a position at which a corner is formed when the first insulator segment 10A and the second insulator segment 10B are assembled and the second insulator segment 10B (a front portion 22) comes into contact with the first insulator segment 10A. The protrusion 19 connects the inner side flange 15a and the outer side flange 16a in the radial direction. A groove 17 is formed in an end portion of the front portion 12 on the second insulator segment 10B side. The groove 17 has a substantially angular-U shaped cross section and connects the inner front flange 15b and the outer front flange 16b in the radial direction.

Figure 3:
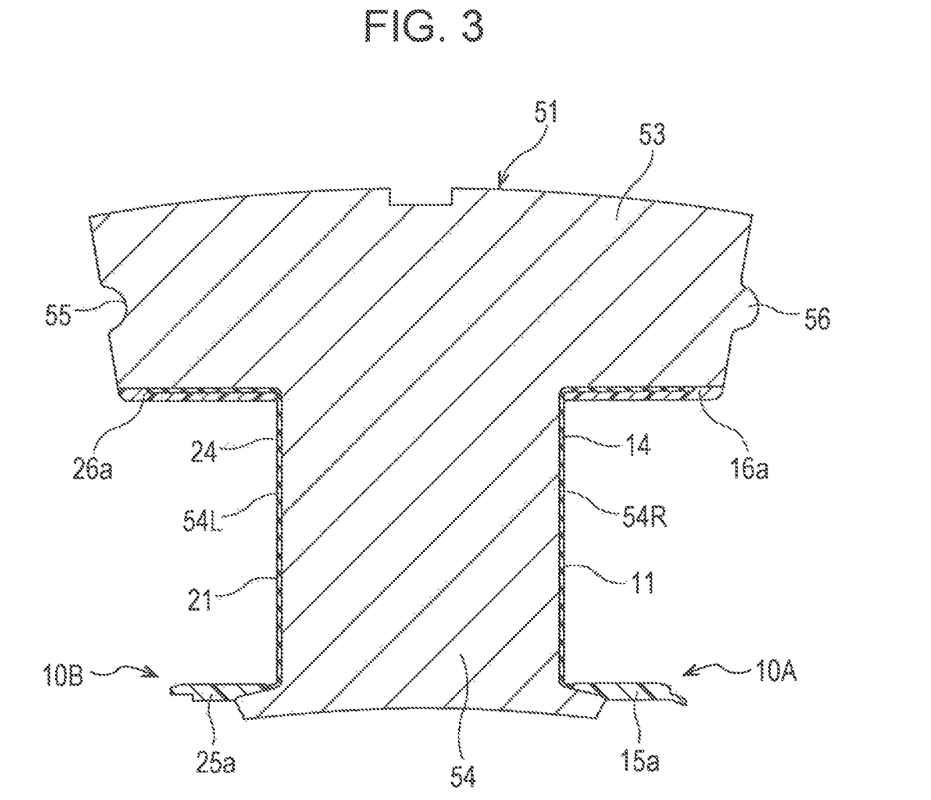
FIG. 3 is a partial sectional view of the stator unit.

Referring also to FIG. 3, the insulating sheet 14 of the side portion 11 is bent in a substantially angular-U shape. An inner end portion and an outer end portion of the insulating sheet 14 are respectively insert molded with the inner side flange 15a and the outer side flange 16a, so that the insulating sheet 14 is integrally formed with the first insulator segment 10A. The insulating sheet 14 is disposed closer than the inner side flange 15a and the outer side flange 16a, each of which is a part of the resin-molded portion 13, to the core portion 51. Thus, when the first insulator segment 10A is attached to the core portion 51, the insulating sheet 14 covers the circumferential-direction end surface 54R of the tooth 54 and a lower surface of the yoke 53. Preferably, the insulating sheet 14 is made from a sheet having a high electrical insulation and a high strength, such as aramid insulating paper.

Second Insulator Segment

The second insulator segment 10B includes a side portion 21, which covers a circumferential-direction end surface 54L of the tooth 54 of the core portion 51, and the front portion 22, which covers a stacking-direction end surface 54B of the core portion 51. The front portion 22 includes a part of a resin-molded portion 23. The side portion 21 includes a part of the resin-molded portion 23 including an inner flange 25 and an outer flange 26 (described below) and an insulating sheet 24 connected to the resin-molded portion 23. The resin-molded portion 23, included in the side portion 21 and the front portion 22, is integrally formed with the insulating sheet 24 by insert molding.

The second insulator segment 10B includes the inner flange 25, which stands out from inner parts of the side portion 21 and the front portion 22. The inner flange 25 includes an inner side flange 25a, which stands out from an inner part of the side portion 21 in the circumferential direction, and an inner front flange 25b, which stands out from an inner part of the front portion 22 in the stacking direction. The inner side flange 25a and the inner front flange 25b are integrally formed so as to surround the peripheries of the side portion 21 and the front portion 22.

The second insulator segment 10B includes the outer flange 26, which stands out from outer parts of the side portion 21 and the front portion 22. The outer flange 26 includes an outer side flange 26a, which stands out from an outer part of the side portion 21 in the circumferential direction, and an outer front flange 26b, which stands out from an outer part of the front portion 22 in the stacking direction. The outer side flange 26a and the outer front flange 26b are integrally formed so as to surround the peripheries of the side portion 21 and the front portion 22.

Stacking-direction extensions 25c and 26c are respectively formed on the inner side flange 25a and the outer side flange 26a so as to extend away from the front portion 22 in the stacking direction. The thickness of the stacking-direction extension 25c is substantially a half the thickness of the inner side flange 25a, because an inner part of the thickness thereof is removed. The thickness of the stacking-direction extension 26c is substantially a half the thickness of the outer side flange 26a, because an outer part of the thickness thereof is removed. Each of the stacking-direction extensions 25c and 26c has a rectangular hole 28, which is an example of a second engagement portion.

Referring also to FIG. 4A, a circumferential-direction extension 25*d* and a circumferential-direction extension 26*d* are formed on the inner front flange 25*b* and the outer front flange 26*b* so as to extend away from the side portion 21 in the circumferential direction. The thickness of the circumferential-direction extension 25*d* is substantially a half the thickness of the inner front flange 25*b*, because an outer part of the thickness thereof is removed. The thickness of the circumferential-direction extension 26*d* is substantially a half the thickness of the outer front flange 26*b*, because an inner part of the thickness thereof is removed. Each of the circumferential-direction extensions 25*d* and 26*d* has a rectangular hole 28, which is an example of a second engagement portion. The rectangular hole 28 may be a groove that is engageable with the rectangular protrusion 18.

A protrusion 29 is formed on the side portion 21 so as to protrude toward the first insulator segment 10A. The protrusion 29 is located at a position at which a corner is formed when the first insulator segment 10A and the second insulator segment 10B are assembled and the first insulator segment 10A (the front portion 12) comes into contact with the second insulator segment 10B. The protrusion 29 connects the inner side flange 25*a* and the outer side flange 26*a* in the radial direction. As illustrated in FIG. 7, a groove 27 is formed in an end portion of the front portion 12 on the first insulator segment 10A side. The groove 27 has a substantially angular-U shaped cross section and connects the inner front flange 25*b* and the outer front flange 26*b* in the radial direction. The protrusion 29 and the groove 27 of the second insulator segment 10B respectively have shapes similar to those of the protrusion 19 and the groove 17 of the first insulator segment 10A.

Referring also to FIG. 3, the insulating sheet 24 of the side portion 21 is bent in a substantially angular-U shape. An inner end portion and an outer end portion of the insulating sheet 24 are respectively insert molded with the inner side flange 25*a* and the outer side flange 26*a*, so that the insulating sheet 24 is integrally formed with the second insulator segment 10B. The insulating sheet 24 is disposed closer than the inner side flange 25*a* and the outer side flange 26*a*, each of which is a part of the resin-molded portion 23, to the core portion 51. Thus, when the second insulator segment 10B is attached to the core portion 51, the insulating sheet 24 covers the circumferential-direction end surface 54L of the tooth 54 and a lower surface of the yoke 53. Preferably, the insulating sheet 24 is made of a sheet having a high electrical insulation and a high strength, such as aramid insulating paper.

Assembly

The first insulator segment 10A and the second insulator segment 10B, having the structures described above, are assembled by being moved closer to each other in the circumferential direction so as to cover the surfaces of the tooth 54. To be specific, the first insulator segment 10A and the second insulator segment 10B are assembled so that the side portion 11 and the front portion 12 of the first insulator segment 10A cover the circumferential-direction end surface 54R and the stacking-direction end surface 54F of the tooth 54 and so that the side portion 21 and the front portion 22 cover the circumferential-direction end surface 54L and the stacking-direction end surface 54B of the second insulator segment 10B of the tooth 54. When the first insulator segment 10A and the second insulator segment 10B are assembled, a coil wire-disposing region, in which the coil wire 2 is to be wound, is formed between the inner flanges 15 and 25 and the outer flanges 16 and 26 and around the side portions 11 and 21 and the front portions 12 and 22.

The stacking-direction extensions 15*c* and 16*c* of the first insulator segment 10A respectively overlap the circumferential-direction extensions 25*d* and 26*d* of the second insulator segment 10B to form overlapping portions. The circumferential-direction extensions 15*d* and 16*d* of the first insulator segment 10A respectively overlap the stacking-direction extensions 25*c* and 26*c* of the second insulator segment 10B to form overlapping portions. In each of the (four) overlapping portions, the rectangular protrusion 18 engages with the rectangular hole 28.

To be specific, as the first insulator segment 10A and the second insulator segment 10B are moved closer to each other in the circumferential direction, the stacking-direction extensions 25*c* and 26*c* and the circumferential-direction extensions 25*d* and 26*d* come into contact with the inclined surfaces 18*b* of the corresponding rectangular protrusions 18 and become elastically deformed. As the vertical walls 18*a* reach end surfaces of the rectangular holes 28 on one side in the circumferential direction, the stacking-direction extensions 25*c* and 26*c* and the circumferential-direction extensions 25*d* and 26*d* elastically return to their original shapes, and the vertical walls 18*a* of the rectangular protrusions 18 engage the rectangular holes 28.

Figure 5:
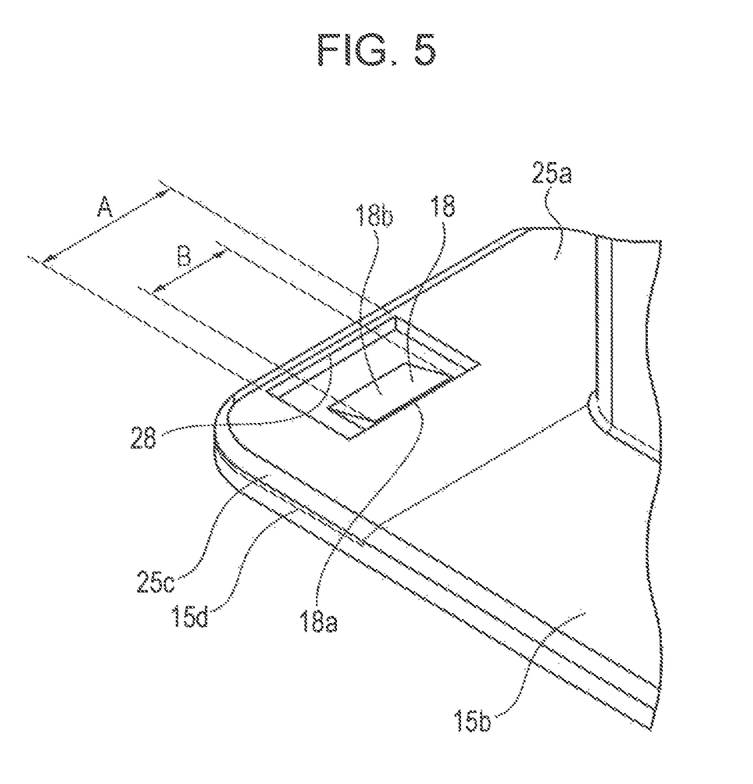
FIG. 5 is a partial enlarged view illustrating how a rectangular protrusion and a rectangular hole engage with each other.

As illustrated in FIG. 5, the length of each of the rectangular holes 28 in the stacking direction is greater than the length of the rectangular protrusion 18 in the stacking direction. That is, when the length of the rectangular hole 28 in the stacking direction is denoted by A, the length of the rectangular protrusion 18 in the stacking direction is denoted by B, and the variation in the stacking thickness of the core portion 51 is denoted by $\Delta$, these dimensions satisfy $A \geq B + \Delta$. That is, the rectangular hole 28 and the rectangular protrusion 18 engage with each other so as to have a movement clearance in which the rectangular hole 28 and the rectangular protrusion 18 are relatively movable in the stacking direction.

Figure 6A:
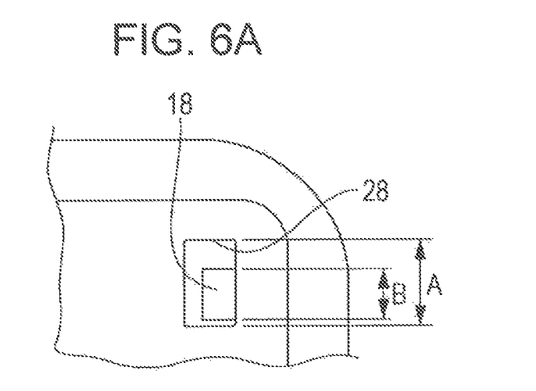
FIGS. 6A to 6C are partial enlarged views of an insulator that is attached to a stator core so as to accommodate a variation in the stacking thickness of the stator core, FIG. 6A illustrating how a rectangular hole and a rectangular protrusion engage with each other when the stacking thickness is the maximum, FIG. 6B illustrating how the rectangular hole and the rectangular protrusion engage with each other when the stacking thickness is about average, and FIG. 6C illustrating how the rectangular hole and the rectangular protrusion engage with each other when the stacking thickness is the minimum.
Figure 6B:
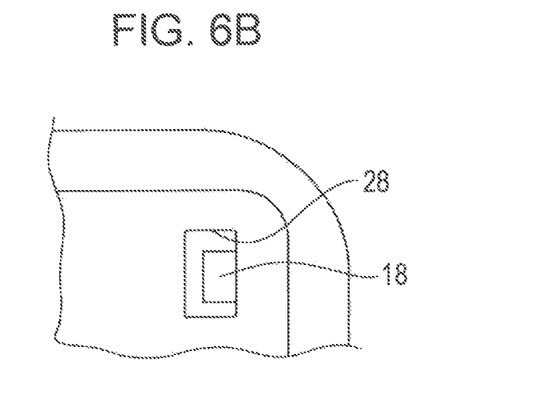
Figure 6C:
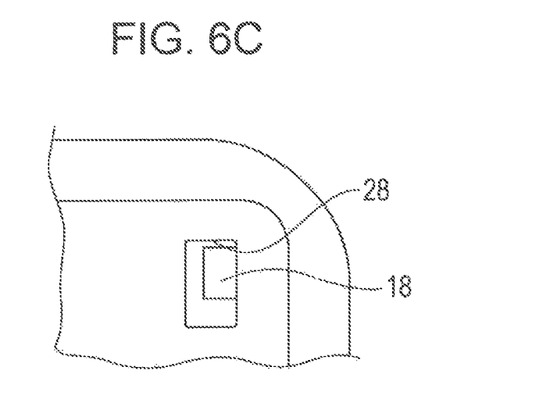

FIGS. 6A to 6C illustrate how the rectangular hole 28 and the rectangular protrusion 18 engage with each other in accordance with the variation in the stacking thickness of the stator core. As illustrated in FIG. 6A, when the stacking thickness is the maximum, the rectangular protrusion 18 engages with a part of the rectangular hole 28 on the core portion 51 side. As illustrated in FIG. 6B, when the stacking thickness is about average, the rectangular protrusion 18 is located at substantially the center of the rectangular hole 28. As illustrated in FIG. 6C, when the stacking thickness is the minimum, the rectangular protrusion 18 is located in a part of the rectangular hole 28 away from the core portion 51.

Thus, the rectangular hole 28 and the rectangular protrusion 18 are configured to engage with each other so as to have a movement clearance in which the rectangular hole 28 and the rectangular protrusion 18 are relatively movable in the stacking direction. Therefore, the first insulator segment 10A and the second insulator segment 10B can move relative to each other in the stacking direction in accordance with the variation $\Delta$ in the stacking thickness of the core portion 51. As a result, the first insulator segment 10A and the second insulator segment 10B can be assembled while accommodating the variation $\Delta$ in the stacking thickness of the core portion 51.

As illustrated in FIG. 7, when the first insulator segment 10A and the second insulator segment 10B are assembled, the protrusion 19 of the first insulator segment 10A engages with the groove 27 of the second insulator segment 10B and the protrusion 29 of the second insulator segment 10B engages with the groove 17 of the first insulator segment 10A.

The length of each of the grooves 17 and 27 in the stacking direction is greater than the length of each of the protrusions 19 and 29 in the stacking direction. That is, when the length of each of the grooves 17 and 27 in the stacking direction is denoted by C, the length of each of the protrusions 19 and 29 in the stacking direction is denoted by D, and the variation in the stacking thickness of the core portion 51 is denoted by Δ, these dimensions satisfy C≥D+Δ. Thus, even if the stacking thickness of the core portion 51 varies, the first and the second insulator segments 10A and 10B can be easily assembled and attached to the core portion 51.

By fitting the protrusions 19 and 29 into the grooves 17 and 27, the core portion 51 and the coil wire 2 can be separated from each other by a sufficient creepage distance at a corner formed by the side portion 11 of the first insulator segment 10A and the front portion 22 of the second insulator segment 10B and at a corner formed by the front portion 12 of the first insulator segment 10A and the side portion 21 of the second insulator segment 10B. Thus, even though the insulator 10 is made by assembling two members, the insulator 10 can reliably insulate the core portion 51 and the coil wire 2 from each other.

The first insulator segment 10A and the second insulator segment 10B include the inner side flanges 15a and 25a and the outer side flanges 16a and 26a, which are parts of the resin-molded portion 13 and which extend upright with respect to the circumferential-direction end surfaces 54R and 54L of the tooth 54. The flanges 15a, 25a, 16a and 26a are disposed so as to extend along both end surfaces of the tooth 54 facing in the stacking direction. Therefore, when the first insulator segment 10A and the second insulator segment 10B are attached to the core portion 51, the insulator 10 can have a sufficient rigidity. As a result, displacement between the stacked electrical steel plates 52, which might occur when winding the coil wire 2, can be suppressed.

As described above, the insulator 10 according to the present embodiment is made by assembling the first insulator segment 10A and the second insulator segment 10B, which are substantially L-shaped. The first insulator segment 10A and the second insulator segment 10B respectively include the side portions 11 and 21, on which the insulating sheets 14 and 24 are disposed so as to cover the circumferential-direction end surfaces 54R and 54L of the tooth 54, and the front portions 12 and 22, which face the stacking-direction end surfaces 54F and 54B of the tooth 54. Moreover, each of the rectangular protrusions 18 formed on the first insulator segment 10A and a corresponding one of the rectangular holes 28 formed in the second insulator segment 10B engage with each other so as to have a movement clearance in which the rectangular protrusion 18 and the rectangular hole 28 are relatively movable in the stacking direction. Accordingly, even if the thickness of the core portion 51 in the stacking direction varies, the engagement portions of the rectangular protrusion 18 and the rectangular hole 28 can accommodate the variation Δ in the stacking direction. Therefore, damage to the insulating sheets 14 and 24, such as creasing or breakage, can be prevented, and the insulator 10 can be easily attached to the core portion 51.

Because the insulating sheets 14 and 24 cover the circumferential-direction end surfaces 54R and 54L of the tooth 54, the thicknesses of parts of the insulator 10 that face the circumferential-direction end surfaces 54R and 54L of the tooth 54 can be reduced. Therefore, the space factor of the coil wire 2 can be increased. Moreover, because the insulator 10 is made by assembling the first insulator segment 10A and the second insulator segment 10B, which are substantially L-shaped, the rectangular protrusion 18 and the rectangular hole 28 can be formed at positions outside the coil wire-disposing region formed between the circumferential-direction end surfaces 54R and 54L of the tooth 54, which are adjacent to each other. As a result, decrease of the space factor of the coil wire 2 can be suppressed, even if the thickness is increased in the overlapping portion.

Because the rectangular protrusion 18 and the rectangular hole 28 are formed in the resin-molded portions 13 and 23, the rectangular protrusion 18 and the rectangular hole 28 can be easily made by resin molding. Therefore, the first insulator segment 10A and the second insulator segment 10B can be efficiently manufactured.

The inner flanges 15 and 25 and the outer flanges 16 and 26 stand out from the side portions 11 and 21 and the front portions 12 and 22, and the rectangular protrusions 18 and the rectangular holes 28 are formed in the inner flanges 15 and 25 and the outer flanges 16 and 26. Therefore, the rectangular protrusions 18 and the rectangular holes 28 can be disposed at positions that do not substantially affect winding of the coil wire 2. As a result, decrease of the space factor of the coil wire 2 due to the presence of the rectangular protrusions 18 and the rectangular holes 28 in the first insulator segment 10A and the second insulator segment 10B can be suppressed.

The rectangular protrusions 18 are formed on the inner flange 15 and the outer flange 16 of the first insulator segment 10A, and the rectangular holes 28 are formed in the inner flange 25 and the outer flange 26 of the second insulator segment 10B. Therefore, the first insulator segment 10A and the second insulator segment 10B can be more reliably fixed to each other.

The stacking-direction extensions 15c and 16c of the inner side flange 15a and the outer side flange 16a and the circumferential-direction extensions 25d and 26d of the inner front flange 25b and the outer front flange 26b are assembled so as to have overlapping portions that overlap each other. The circumferential-direction extensions 15d and 16d of the inner front flange 15b and the outer front flange 16b and the stacking-direction extensions 25c and 26c of the inner side flange 25a and the outer side flange 26a are assembled so as to have overlapping portions that overlap each other. The rectangular protrusions 18 and the rectangular holes 28 are formed in these overlapping portions. Therefore, when attaching the first insulator segment 10A and the second insulator segment 10B to the core portion 51, the rectangular protrusions 18 and the rectangular holes 28 can be easily made to engage with each other.

The length A of the rectangular hole 28 in the stacking direction is greater than the length B of the rectangular protrusion 18 in the stacking direction. Therefore, even if there is a variation Δ in the stacking thickness of the plurality of electrical steel plates 52 of the core portion 51, the variation Δ of the stacking thickness can be accommodated due to the difference (A−B) between the length of the rectangular hole 28 and the length of the rectangular protrusion 18. Moreover, the first insulator segment 10A and the second insulator segment 10B can be easily attached to the core portion 51, and damage to the insulating sheets 14 and 24 of the first insulator segment 10A and the second insulator segment 10B can be suppressed.

The difference between the length A of the rectangular hole 28 in the stacking direction and the length B of the rectangular protrusion 18 in the stacking direction (A−B) is greater than the variation Δ in the stacking thickness of the plurality of electrical steel plates 52 that are stacked. Therefore, even if there is a variation Δ in the stacking thickness of the plurality of electrical steel plates 52 of the core portion 51, the variation Δ of the stacking thickness can be reliably accommodated due to the difference (A−B) between the length of the rectangular hole 28 and the length of the rectangular protrusion 18.

The protrusions 19 and 29 and the grooves 17 and 27, which engage with each other when the first insulator segment 10A and the second insulator segment 10B are assembled, are formed in a corner formed by the side portion 11 of the first insulator segment 10A and the front portion 22 of the second insulator segment 10B and a corner formed by the front portion 12 of the first insulator segment 10A and the side portion 21 of the second insulator segment 10B. Therefore, a predetermined creepage distance can be provided at the corners at which the first insulator segment 10A and the second insulator segment 10B contact each other. As a result, the core portion 51 and the coil wire 2 can be reliably insulated from each other.

The present disclosure is not limited to the embodiment described above, which may be modified or improved as appropriate. For example, in the embodiment described above, the rectangular protrusions 18 are formed on the first insulator segment 10A, and the rectangular holes 28 are formed in the second insulator segment 10B. Alternatively, the rectangular holes 28 may be formed in the first insulator segment 10A, and the rectangular protrusions 18 may be formed on the second insulator segment 10B. It is not necessary that the rectangular protrusions 18 and the rectangular holes 28 be disposed in both of the inner flanges 15 and 25 and the outer flanges 16 and 26. Alternatively, the rectangular protrusions 18 and the rectangular holes 28 may be disposed in only one of these. In the embodiment described above, the stator core includes the plurality of core portions 51 that are annularly arranged. However, this is not a limitation, and the stator core may include annular electrical steel plates that are stacked.

What is claimed is:

1. An insulator disposed between a tooth of a stator core and a coil wire wound around the tooth, the stator core including a plurality of magnetic plates that are stacked, the tooth extending in a radial direction, the insulator comprising:
    a pair of segments that are assembled, each of the segments including a resin-molded portion and an insulating sheet connected to the resin-molded portion,
    wherein each of the segments is substantially L-shaped and includes a side portion, on which the insulating sheet is disposed so as to cover at least a part of a circumferential-direction end surface of the tooth, and a front portion, which faces a stacking-direction end surface of the tooth, and
    wherein a first engagement portion formed in one of the segments and a second engagement portion formed in the other segment engage with each other so as to have a movement clearance in which the first engagement portion and the second engagement portion are relatively movable in a stacking direction.

2. The insulator according to claim 1,
    wherein at least one of the first engagement portion and the second engagement portion is formed in the resin-molded portion.

3. The insulator according to claim 1,
    wherein a flange stands out from at least one of the side portion and the front portion, and
    wherein at least one of the first engagement portion and the second engagement portion is formed in the flange.

4. The insulator according to claim 3,
    wherein the flange includes an inner flange and an outer flange,
    wherein the first engagement portion is formed in each of the inner flange and the outer flange of the one of the segments, and
    wherein the second engagement portion is formed in each of the inner flange and the outer flange of the other segment.

5. The insulator according to claim 1,
    wherein a flange including a stacking-direction extension stands out from the side portion of the one of the segments, the stacking-direction extension extending further than the front portion in the stacking direction,
    wherein a flange including a circumferential-direction extension stands out from the front portion of the other segment, the circumferential-direction extension extending further than the side portion in the circumferential direction,
    wherein the stacking-direction extension and the circumferential-direction extension are assembled so as to have an overlapping portion at which the stacking-direction extension and the circumferential-direction extension overlap each other, and
    wherein the first engagement portion and the second engagement portion are formed in the overlapping portion.

6. The insulator according to claim 1,
    wherein the first engagement portion is a protrusion,
    wherein the second engagement portion is a groove or a hole, and
    wherein a length of the second engagement portion in the stacking direction is greater than a length of the first engagement portion in the stacking direction.

7. The insulator according to claim 6,
    wherein a difference between the length of the second engagement portion in the stacking direction and the length of the first engagement portion in the stacking direction is greater than a variation in a stacking thickness of the plurality of plates that are stacked.

8. The insulator according to claim 1,
    wherein a protrusion and a groove, which are fitted to each other when the segments are assembled, are disposed in a corner formed by the side portion of the one of the segments and the front portion of the other segment and a corner formed by the front portion of the one of the segments and the side portion of the other segment.

* * * * *